United States Patent
Doria

(10) Patent No.: US 12,487,140 B2
(45) Date of Patent: Dec. 2, 2025

(54) METHOD FOR PRODUCING A DIFFERENTIAL PRESSURE SENSOR AND CORRESPONDING DIFFERENTIAL PRESSURE SENSOR

(71) Applicant: Endress+Hauser SE+Co. KG, Maulburg (DE)

(72) Inventor: Patrick Doria, Berlin (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 275 days.

(21) Appl. No.: 18/256,678

(22) PCT Filed: Nov. 26, 2021

(86) PCT No.: PCT/EP2021/083100
§ 371 (c)(1),
(2) Date: Jun. 9, 2023

(87) PCT Pub. No.: WO2022/122409
PCT Pub. Date: Jun. 16, 2022

(65) Prior Publication Data
US 2024/0035913 A1    Feb. 1, 2024

(30) Foreign Application Priority Data

Dec. 11, 2020    (DE) ..................... 10 2020 133 204.1

(51) Int. Cl.
*G01L 19/14*    (2006.01)
*G01L 19/06*    (2006.01)

(52) U.S. Cl.
CPC ........ *G01L 19/142* (2013.01); *G01L 19/0618* (2013.01); *G01L 19/0645* (2013.01)

(58) Field of Classification Search
None
See application file for complete search history.

(56) References Cited

U.S. PATENT DOCUMENTS

| 4,019,388 A | 4/1977 | Hall, II et al. |
| 7,497,127 B2 * | 3/2009 | Burczyk ............... G01L 13/026 73/706 |
| 11,137,308 B2 * | 10/2021 | Craddock ........... G01L 19/0645 |

FOREIGN PATENT DOCUMENTS

| CN | 105716745 B | * | 5/2018 | ............. G01L 1/005 |
| CN | 108507715 A | * | 9/2018 | ........... G01L 13/028 |

(Continued)

*Primary Examiner* — Peter J Macchiarolo
*Assistant Examiner* — Jermaine L Jenkins
(74) *Attorney, Agent, or Firm* — Kelly J. Smith; Endress+Hauser (USA) Holding, Inc.

(57) ABSTRACT

A method for producing a differential pressure sensor includes steps of: introducing a rotationally-symmetrical electronics module into a cavity of a mechanical module until a contact face of the electronics module hits a stop face of the mechanical module; welding and/or gluing at least the contact face to the stop face; axial welding in an opening region of the cavity, such that the mechanical module is welded to the electronics module all around by means of the weld; filling at least two pressure transmission lines with a pressure transmission liquid, wherein the at least two pressure transmission lines are provided for the transmission of the first pressure and the second pressure from the first separating membrane and the second separating membrane, respectively, to two opposing faces of the differential pressure sensor element; and placing the housing onto the housing adapter.

6 Claims, 5 Drawing Sheets

(56) References Cited

FOREIGN PATENT DOCUMENTS

| | | |
|---|---|---|
| CN | 208818407 U | 5/2019 |
| CN | 210464778 U | 5/2020 |
| DE | 102018105867 A1 | 9/2019 |
| DE | 102018121446 A1 | 3/2020 |
| DE | 102019132867 A1 | 6/2021 |
| DE | 102020116172 A1 * | 12/2021 |
| DE | 102020121582 A1 * | 2/2022 |
| DE | 102020121583 A1 * | 2/2022 |
| WO | WO-2005012864 A1 * | 2/2005 ......... G01L 19/0618 |

* cited by examiner

METHOD FOR PRODUCING A DIFFERENTIAL PRESSURE SENSOR AND CORRESPONDING DIFFERENTIAL PRESSURE SENSOR

CROSS-REFERENCE TO RELATED APPLICATIONS

The present application is related to and claims the priority benefit of DPMA Patent Application No. 10 2020 133 204.1, filed on Dec. 11, 2020, and International Patent Application No. PCT/EP2021/083100, filed Nov. 26, 2021, the entire contents of which are incorporated herein by reference.

TECHNICAL FIELD

The invention relates to a method for producing a differential pressure sensor and to a differential pressure sensor produced thereby.

BACKGROUND

Differential pressure sensors are used in industrial metrology to measure differential pressures. Differential pressure measuring devices are used in particular for continuously measuring pressure differences in measurement media—for example, in liquids, vapors, gases, and dusts. From the differential pressure, the fill-level of contents in a tank or the flow of a measurement medium through a pipe conduit, for example, can be determined.

In pressure measurement technology, so-called semiconductor sensor elements, e.g., silicon chips with doped-in resistance elements, are often used as pressure-sensitive elements. Corresponding differential pressure sensor elements typically have a measuring membrane, a first face of which is exposed during measuring operation to a first pressure and a second face of which is exposed to a second pressure. The pressures acting upon the two faces result in a deflection of the measuring membrane, which corresponds to the differential pressure to be measured. As a rule, pressure sensor chips are very sensitive and are therefore not directly exposed to a medium whose pressure is to be detected. Instead, the first pressure and the second pressure are transmitted from the first separating membrane and second separating membrane by means of a pressure transmission liquid to the two faces of the differential pressure sensor element. In addition, an overload protection in the form of an overload membrane is sometimes used in order to protect the differential pressure sensor element from excessively high pressures.

Differential pressure sensors consist of a plurality of individual components, which are generally integrated sequentially and by manual work into the differential pressure sensor. At least partial automation of the individual steps would be desirable, but is often difficult to implement with common designs of the differential pressure sensor.

A simplified concept of a differential pressure sensor has become known from the unpublished patent application DE 10 2019 132 867. The differential pressure sensor consists essentially of a sensor assembly, which has at least one differential pressure sensor element, and a main body, on which two separating membranes and an optional overload membrane are disposed. The sensor assembly is introduced into a cavity of the main body and welded in with the aid of a welding ring.

SUMMARY

The object of the present invention is therefore that of proposing a modularly constructed differential pressure sensor which can be manufactured more easily and more economically than comparable differential pressure sensors, as well as a corresponding method for producing such a differential pressure sensor.

The object is achieved according to the invention by a method for producing a differential pressure sensor, having at least the following method steps:
providing a substantially rotationally-symmetrical electronics module, wherein the electronics module is provided with at least
  a main body, wherein an outer lateral face of the main body is produced as a housing adapter corresponding to a housing,
  an electronics unit, which is provided in an interior of the main body,
  a differential pressure sensor element for determining a differential pressure arising between a first pressure p1 and a second pressure p2,
providing a mechanical module, wherein the mechanical module is provided with at least
  a measuring unit, wherein a first separating membrane and a second separating membrane are provided on the measuring unit, wherein the first pressure p1 is applied to the first separating membrane and the second pressure p2 is applied to the second separating membrane,
  a substantially rotationally-symmetrical cavity of the measuring unit for receiving the electronics module, wherein an inner contour of the cavity is matched to an outer contour of the electronics module in such a way that the electronics module can be inserted into the cavity,
introducing the electronics module into the cavity of the mechanical module, wherein the electronics module is inserted into the cavity until a contact face of the electronics module hits a stop face of the mechanical module,
welding or gluing the electronics module into the mechanical module, wherein at least the contact face is welded or glued to the stop face,
axial welding in an opening region of the cavity, such that the mechanical module is welded to the electronics module all around by means of the weld,
filling at least two pressure transmission lines with a pressure transmission liquid, wherein the at least two pressure transmission lines are provided for the transmission of the first pressure p1 and the second pressure p2 from the first separating membrane and the second separating membrane, respectively, to two opposing faces of the differential pressure sensor element, and
placing the housing onto the housing adapter.

The method according to the invention provides that an electronics module and a mechanical module be provided, which can be manufactured independently of one another and contain all essential components of the differential pressure sensor. Subsequently, the electronics module is inserted into the mechanical module, and the two modules are connected to one another—preferably by welds, but also by adhesive bonds. The stop face is connected to the contact face preferably by means of resistance welding. Subsequently, the differential pressure sensor must still be filled with the pressure transmission liquid—generally, silicone oil—and the housing must be placed onto the housing adapter. The housing serves to protect the electronics, and preferably has a display unit.

As a result of the modularization of the differential pressure sensor, the electronics module and the mechanical module can be produced in parallel and simultaneously, and are subsequently assembled within a few steps to form a complete differential pressure sensor.

In a further development of the method according to the invention, the electronics module is produced from a glass-metal feedthrough.

In another further development of the method according to the invention, the electronics module is produced with a preferably additionally applied, ceramic base disk, wherein, before the electronics module is provided, the differential pressure sensor element is applied to the base disk. The base disk serves, for example, as a support for the differential pressure sensor element and as a means of reducing mechanical influences on the differential pressure sensor element.

Another further development of the method according to the invention provides that the electronics module be produced with at least one, preferably additionally applied, insulating body, wherein, before the electronics module is provided, the insulating body is applied to the differential pressure sensor element. The insulating body protects the differential pressure sensor element in particular against external electrical influences.

Preferably, the mechanical module is provided with an overload membrane in the measuring unit. Before the mechanical module is provided, the first separating membrane is welded onto a first outer face of the measuring unit, and the second separating membrane is, initially, preferably welded onto a support, which is subsequently welded onto a second outer face of the measuring unit opposite the first outer face.

The object is also achieved by a differential pressure sensor which is produced by means of the method according to the invention. Due to its modular concept, the differential pressure sensor according to the invention can be produced more easily and more economically than conventional differential pressure sensors. In particular, the two modules, the electronics module and the mechanical module, are manufactured independently of one another.

BRIEF DESCRIPTION OF THE DRAWINGS

The invention is explained in greater detail below with reference to the following figures, FIGS. 1-5. In the figures.

DETAILED DESCRIPTION

Figure 1:
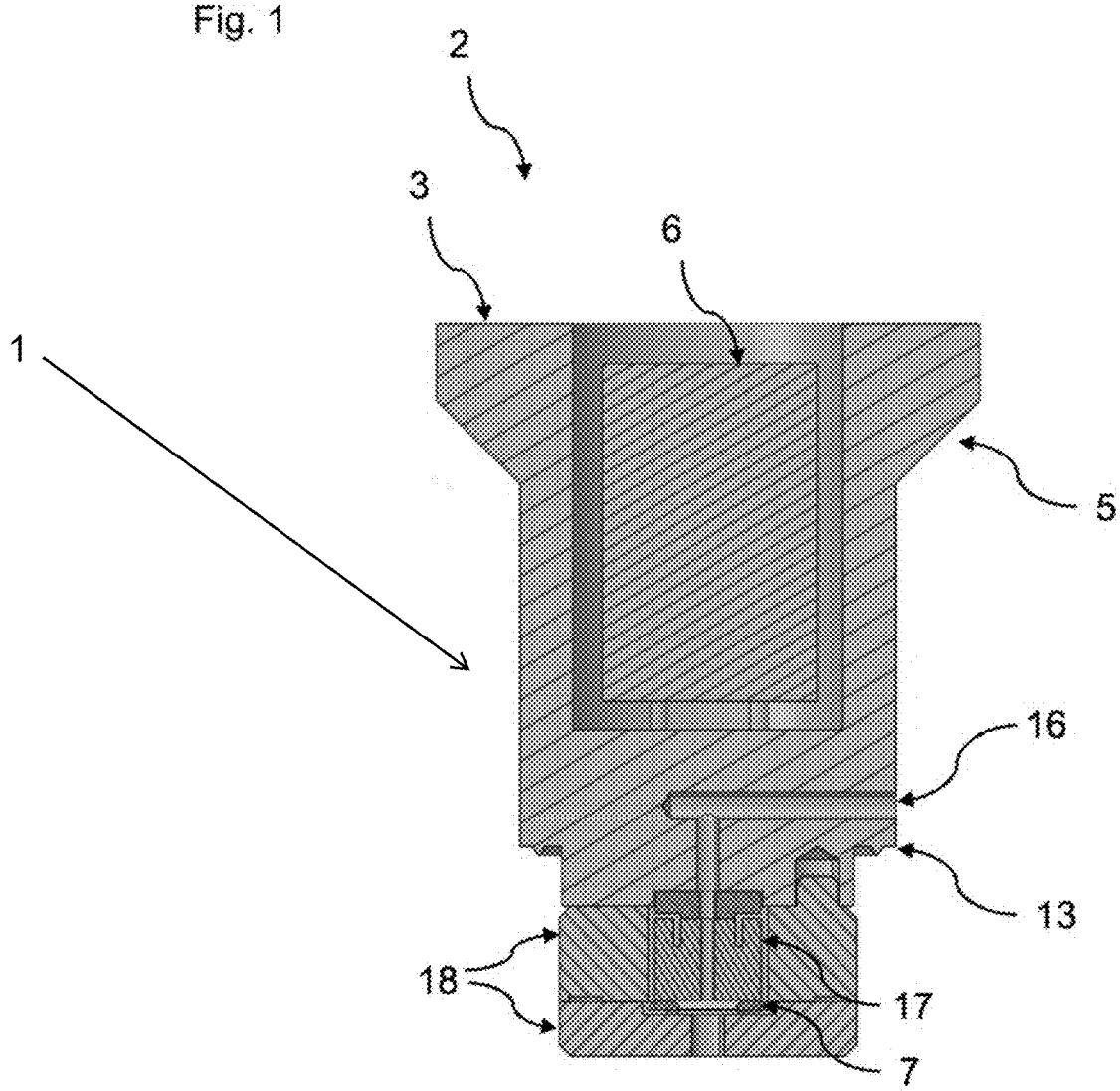
FIG. 1 shows a schematic embodiment of the electronics module.

FIG. 1 shows a schematic embodiment of the electronics module 2 of the differential pressure sensor 1 according to the invention. The electronics module 2 is substantially rotationally symmetrical and consists, for example, of a glass-metal feedthrough. The differential pressure sensor element 7 is attached to the main body 3 of the electronics module 2. By way of example, the differential pressure sensor element has been applied to a base disk 17—for example, by means of bonding. In addition, an insulating body 18 is optionally attached to protect the differential pressure sensor element 7 from undesired electronic influences. An electronics unit 6 is introduced into an interior of the electronics module 2 and is in contact with the differential pressure sensor element 7. Furthermore, an outer lateral face of the electronics module 2 is shaped as a housing adapter 5, so that, after the electronics module 2 has been assembled with the mechanical module 8, the housing 4 can be placed onto the corresponding housing adapter 5. Pressure transmission lines 16 also lead through the electronics module 2 to apply the first pressure p1 and the second pressure p2 to the differential pressure sensor element 7. The contact face 13 is later used for inserting the electronics module 2 into the cavity 12 of the mechanical module 8 to a defined depth. The electronics module 2 is initially manufactured separately and provided to the further production process of the differential pressure sensor 1.

Figure 2:
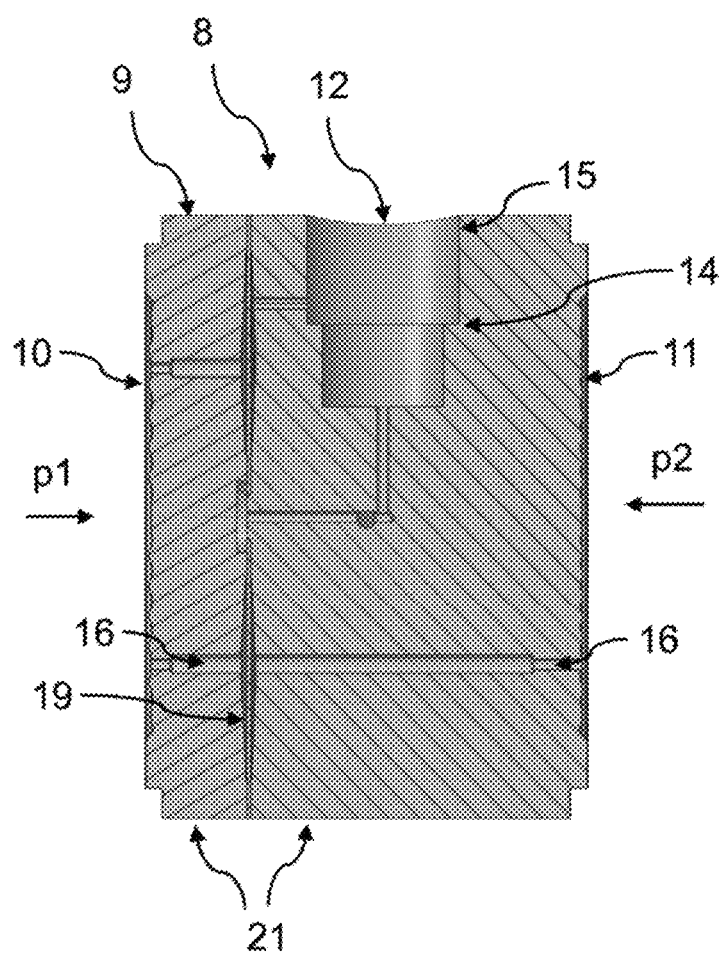
FIG. 2 shows a schematic embodiment of the mechanical module.

The provided mechanical module 8 is shown in an exemplary embodiment in FIG. 2. The measuring unit 9 consists, for example, of two carrier disks 21, to which the second separating membrane 11 and the first separating membrane 10, respectively, are welded. The two carrier disks 21 form the measuring unit 9 of the mechanical module 8, which also has an optional overload membrane 19 welded between the two carrier disks 21. Pressure transmission lines 16 lead from the first separating membrane 10 and the second separating membrane 11, respectively, over the overload membrane 19 to the differential pressure sensor element 7 in order to apply to it the first pressure p1 and the second pressure p2, and therefrom determine a differential pressure. The substantially rotationally-symmetrical cavity 12 serves to receive the electronics module 2. In combination with the contact face 13, the stop face 14 defines a depth to which the electronics module 2 can be inserted into the mechanical module 8.

Figure 3:
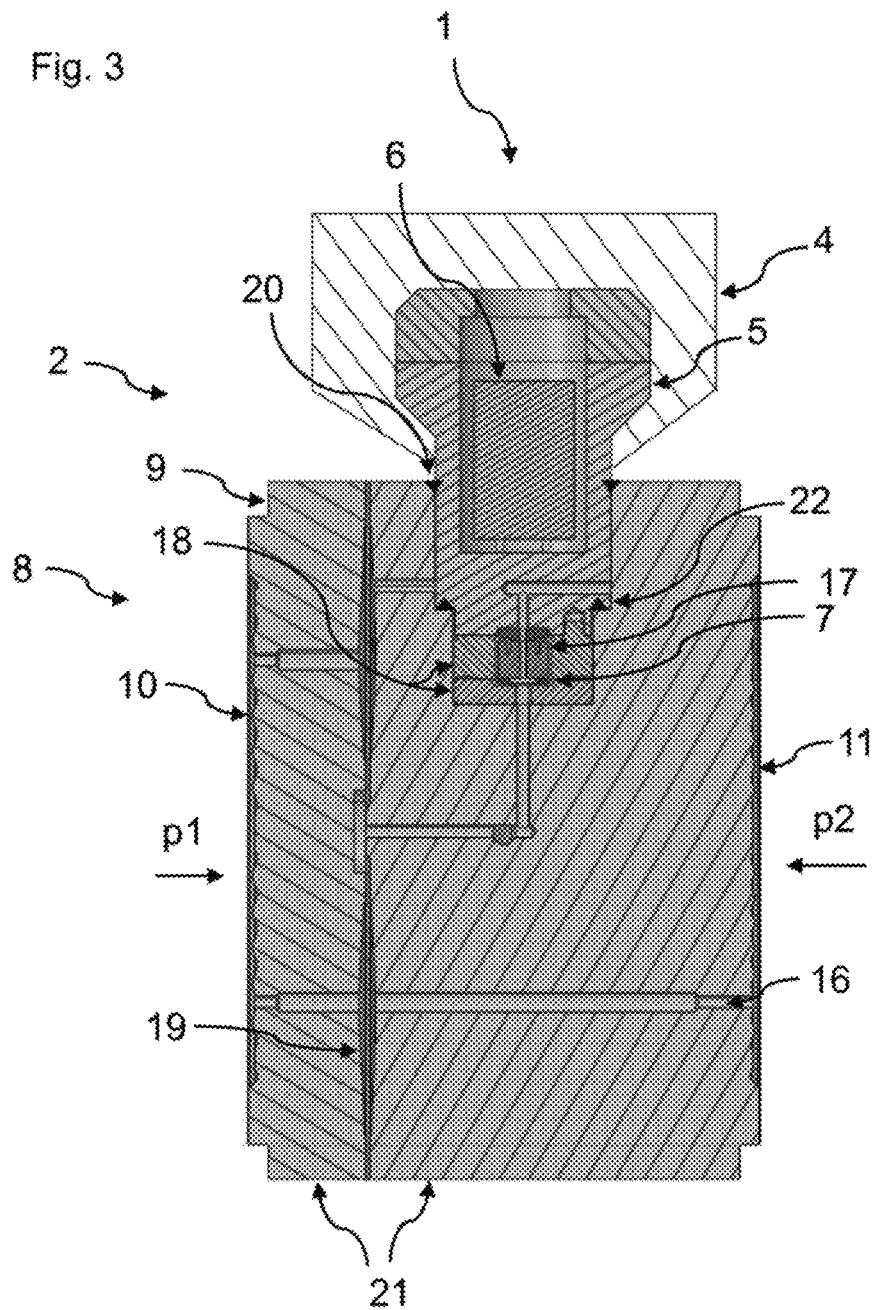
FIG. 3 shows a schematic embodiment of the differential pressure sensor according to the present disclosure.

FIG. 3 shows a possible embodiment of the differential pressure sensing device 1 according to the invention. The electronics module 2 has been inserted into the cavity 12 of the mechanical module 8 until the stop face 14 hits the contact face 13. The two modules 2, 8 are welded to one another in two locations in order to separate the two pressure sides from one another: once in the region of the stop face 14 and the contact face 13—see the weld seam 22—and once in the opening region of the cavity 12, resulting in the axial weld seam 20. The stop face 14 can alternatively be glued to the contact face 13. The housing 4 is ultimately attached to the housing adapter 5.

Figure 4:
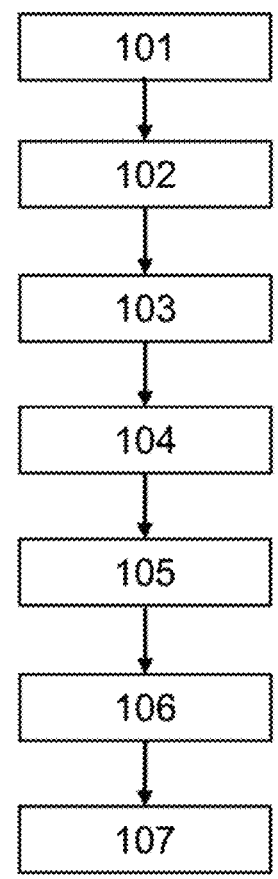
FIG. 4 shows a first schematic diagram of the method according to the present disclosure.
Figure 5:
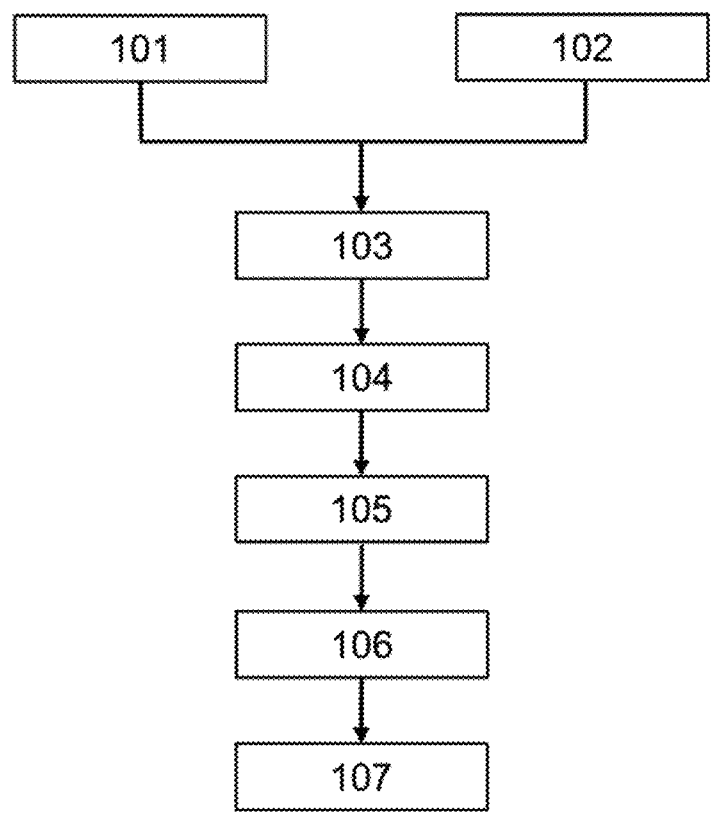
FIG. 5 shows a second schematic diagram of the method according to the present disclosure.

FIG. 4 schematically illustrates the method according to the invention. In the first step 101, the electronics module 2 is provided, which, as shown in FIG. 1, has been produced with a main body 3, a housing adapter 5, an electronics unit 6 in the interior of the main body 3, and the differential pressure sensor element 7. In the second step 102, the mechanical module 8 is provided, which, according to the embodiment in FIG. 2, has been produced with a measuring unit 9 and two separating membranes 10, 11 provided thereon, as well as the cavity 12. The first step 101 and the second step 102 can begin at the same time so that the electronics module 2 and the mechanical module 8 are produced and provided in parallel, as schematically illustrated in FIG. 5.

Since the outer contour of the electronics module 2 is matched to the inner contour of the cavity 12 such that the electronics module 2 can be inserted into the cavity 12, the electronics module 2 is now introduced into the cavity 12 of the mechanical module 8 in the third step 103. The electronics module 2 is inserted into the cavity 12 to the depth at which the contact face 13 hits the stop face 14 of the mechanical module 8.

In the fourth step 104 of the method according to the invention, at least the contact face 13 of the electronics module 2 is welded or glued to the stop face 14. In the fifth step 105, the electronics module 2 is welded, axially and all around, to the mechanical module 8 in the opening region 15 of the cavity 12. Since the two pressure sides are now separated from one another, the at least two pressure transmission lines 16 can be filled with a pressure transmission liquid in the sixth step 106. Finally, the housing 4 is placed on the housing adapter 5 in the last step 107.

The invention claimed is:

1. A method for producing a differential pressure sensor, having at least the following method steps:
   providing a substantially rotationally-symmetrical electronics module, wherein the electronics module is provided with at least
      a main body, wherein an outer lateral face of the main body is produced as a housing adapter corresponding to a housing,
      an electronics unit, which is provided in an interior of the main body,
      a differential pressure sensor element for determining a differential pressure arising between a first pressure and a second pressure,
   providing a mechanical module, wherein the mechanical module is provided with least
      a measuring unit, wherein a first separating membrane and a second separating membrane are provided on the measuring unit, wherein the first pressure is applied to the first separating membrane and the second pressure is applied to the second separating membrane,
      a substantially rotationally-symmetrical cavity of the measuring unit for receiving the electronics module, wherein an inner contour of the cavity is matched to an outer contour of the electronics module in such a way that the electronics module is inserted into the cavity,
   introducing the electronics module into the cavity of the mechanical module, wherein the electronics module is inserted into the cavity until a contact face of the electronics module hits a stop face of the mechanical module,
   welding and/or gluing the electronics module into the mechanical module, wherein at least the contact face is welded or glued to the stop face,
   axial welding in an opening region of the cavity, such that the mechanical module is welded to the electronics module all around by means of the weld,
   filling at least two pressure transmission lines with a pressure transmission liquid,
   wherein the at least two pressure transmission lines are provided for the transmission of the first pressure and the second pressure from the first separating membrane and the second separating membrane, respectively, to two opposing faces of the differential pressure sensor element, and
   placing the housing onto the housing adapter.

2. The method for producing a differential pressure sensor according to claim 1,
   wherein the electronics module is produced from a glass-metal feedthrough.

3. The method for producing a differential pressure sensor according to claim 1,
   wherein the electronics module is produced with a preferably additionally applied, ceramic base disk, wherein, before the electronics module is provided, the differential pressure sensor element is applied to the base disk.

4. The method for producing a differential pressure sensor according to claim 1,
   wherein the electronics module is produced with at least one, preferably additionally applied, insulating body, wherein, before the electronics module is provided, the insulating body is applied to the differential pressure sensor element.

5. The method for producing a differential pressure sensor according to claim 1,
   wherein the mechanical module is provided with an overload membrane in the measuring unit.

6. A differential pressure sensor produced according to the method of claim 1.

* * * * *